Feb. 20, 1923.
G. L. LAWRENCE, Jr., ET AL.
RECORDING GAUGE FOR SHEET STOCK.
FILED NOV. 8, 1921.
1,446,300.
2 SHEETS—SHEET 1.
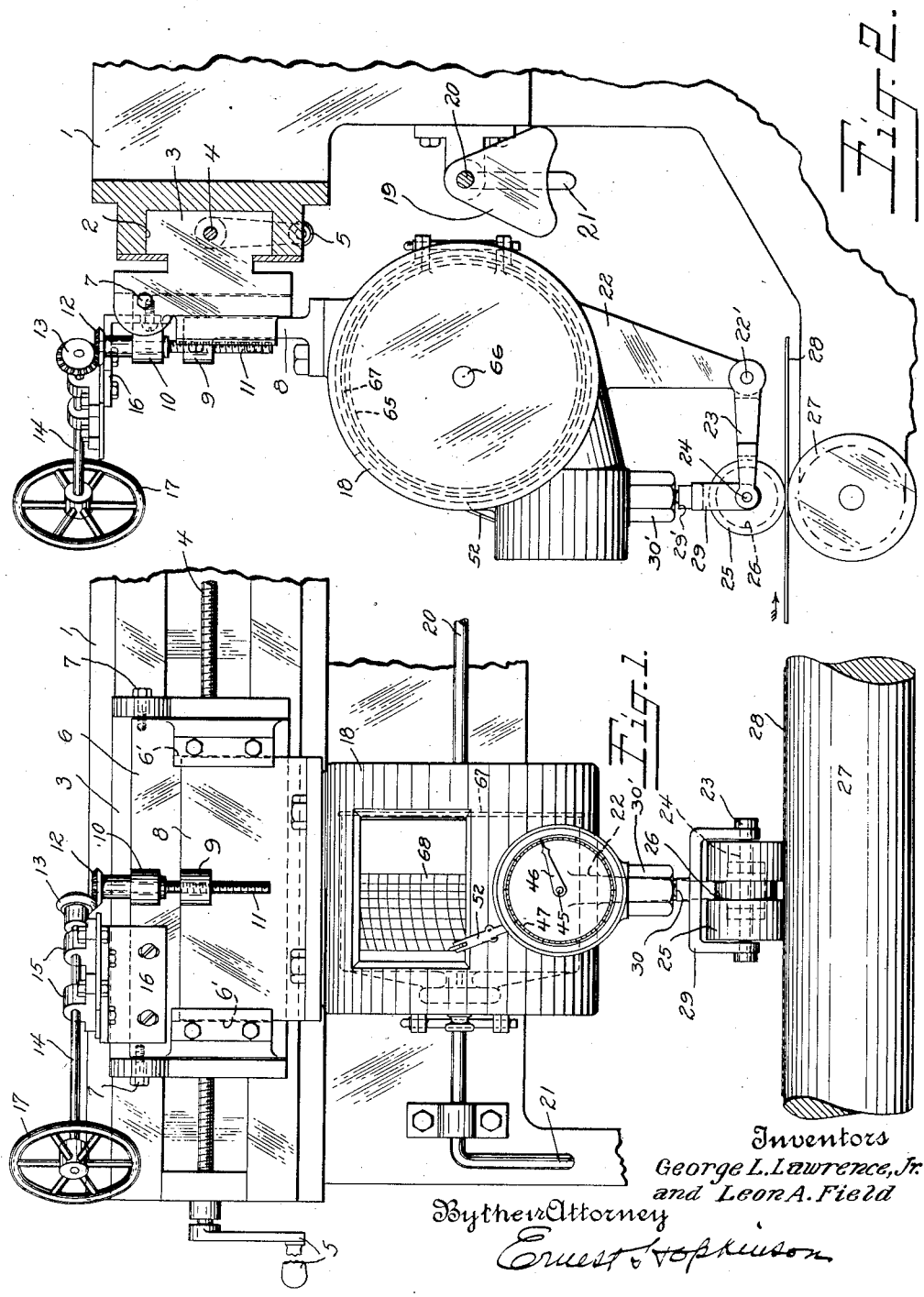
Inventors
George L. Lawrence, Jr.
and Leon A. Field
By their Attorney
Ernest Hopkinson

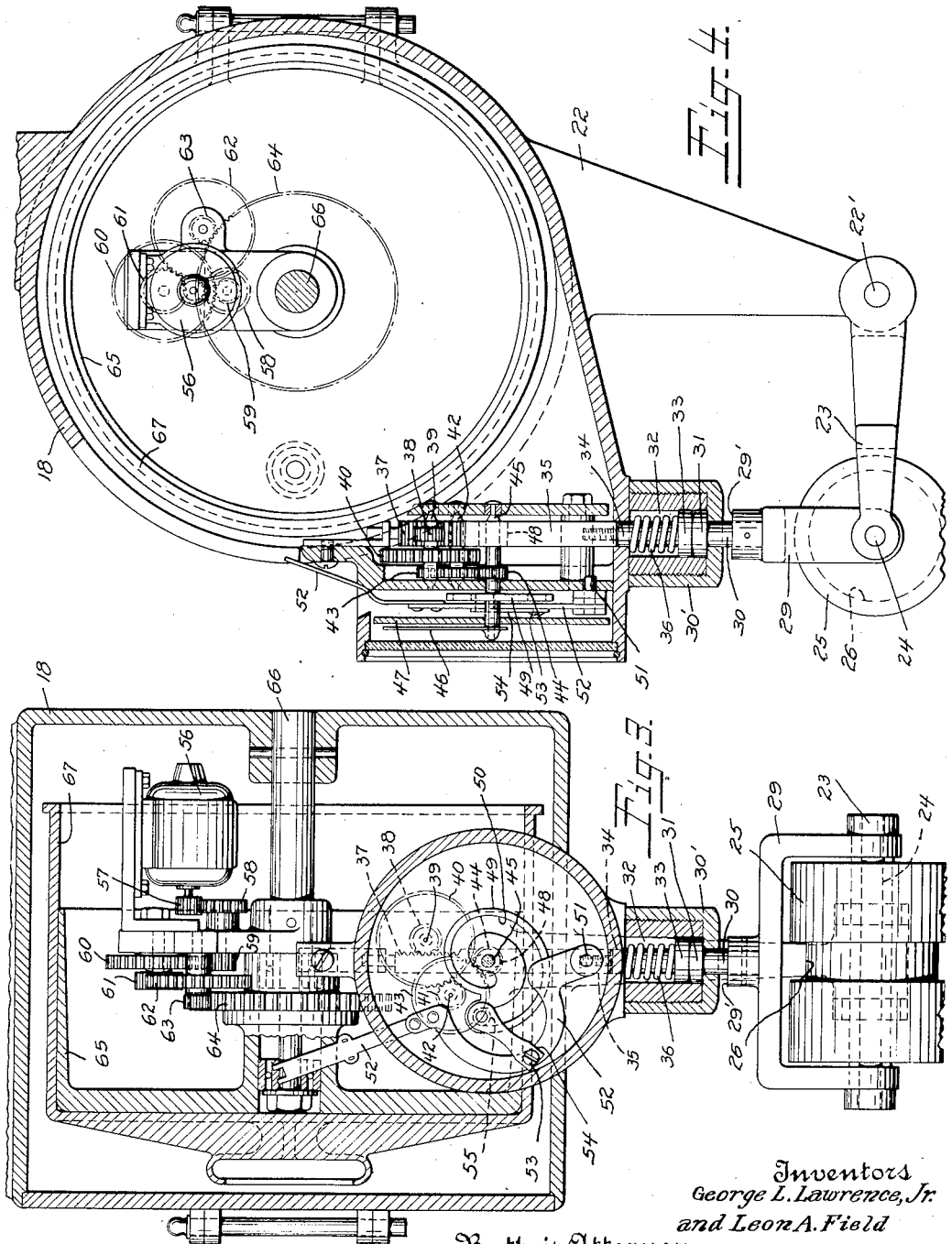

Patented Feb. 20, 1923.

1,446,300

UNITED STATES PATENT OFFICE.

GEORGE L. LAWRENCE, JR., OF MELROSE, AND LEON A. FIELD, OF MALDEN, MASSACHUSETTS, ASSIGNORS TO BOSTON RUBBER SHOE COMPANY, A CORPORATION OF MASSACHUSETTS.

RECORDING GAUGE FOR SHEET STOCK.

Application filed November 8, 1921. Serial No. 513,753.

*To all whom it may concern:*

Be it known that we, GEORGE L. LAWRENCE, Jr., and LEON A. FIELD, citizens of the United States, residing at Melrose, in the county of Middlesex and State of Massachusetts, and Malden, in the county of Middlesex and State of Massachusetts, respectively, have invented certain new and useful Improvements in Recording Gauges for Sheet Stock, of which the following is a full, clear, and exact description.

This invention relates to a recording gauge for sheet stock, more particularly to a gauge for use with calendered sheets of plastic material, such as rubber, or sheets of fabric and rubber, and is a continuation in part of our application Serial No. 353,426, filed January 23, 1920.

In the use of calenders for producing sheets of rubber, or rubber-coated fabrics, it is essential that a gauge be provided in order that variations in the thickness of the stock may be detected, and the defect corrected by adjustment of the calender rolls. Also it is important that some means be provided by which the time that the calender is producing stock can be ascertained and also the gauge of the stock recorded. As the width and thickness of the sheets to be calendered varies widely the gauge must be readily adjustable in position to accord with the sheet to be gauged, and it must at the same time be movable to inoperative position, when desired, without alteration of its adjustments. Great difficulty has been experienced in providing gauge mechanism suitable for use with sheet stock of rubber or other plastic material, owing to the characteristics of the material. The sheet rubber stock is frequently calendered in thicknesses of only a few thousandths of an inch, and the gauge used must therefore be capable of accurately indicating variations in thickness measured in thousandths of an inch. The stock as it comes from the calenders is also hot, soft or plastic, and somewhat sticky and in the case of some compounds it is extremely plastic and tacky in nature, hence gauges designed for general use with sheet materials have proved impracticable. The gauges in use are frequently actuated by a rack or other reciprocable member extending outside of the gauge, and having connected thereto a contact member or roller for engaging the stock. A light spring is usually used to overcome the internal friction of the gauge and to maintain the contact roller in engagement with the stock. However, if this spring, as is sometimes the case, be made too light, it fails to overcome the friction, and as a result the gauge is slow to respond to variations in thickness, and does not indicate correctly on account of failure to closely contact with the stock at all times. On the other hand, if the spring be made stronger in order to overcome the friction, the contact roller tends to stick to the material and it is also pressed into the same, with resultant failure to properly indicate variations in the thickness. A further defect of gauges of this character is that owing to the drag of the stock on the contact roller considerable side thrust is put upon the rack and consequent increase in the internal friction of the gauge. Also by reason of the drag of the stock on the contact roller the stock tends to wrinkle and become distorted at the point where it engages the roller. A still further defect has been that gauges have previously been rigidly mounted in position, and are liable to injury upon passage beneath the contact roller of unusually thick material or obstructions in excess of the gauging capacity of the instrument. In addition, in the recording gauges of the prior art, as far as we are aware, a train of mechanism actuates the gauge from the sheet contacting device, and the recording means is actuated by a comparatively long train connected to the first one at some intermediate point, or vice versa. As a result there is considerable loss motion between the gauge and recording means, and due to this their indications are not in absolute accordance, which is particularly undesirable in the case where very thin gauge stock is to be measured.

An object of our invention is to provide an improved indicating and recording device for sheeted plastic and tacky material.

Another object is to provide a recording gauge in which the indications of the gauge and recording mechanism will be kept in accordance as far as possible.

Another object is to provide an indicating and recording device having so little internal friction that it will accurately record very small differences in the thickness of sheeted plastic material with very light pressure on the material.

Still another object is to provide a mounting for the gauge such that the latter may be readily adjusted in accordance with the thickness and width of the sheet to be gauged.

A further object is to provide means for readily moving the indicating and recording device to and from operative position without alteration of its adjustment.

A still further object is to provide means whereby the indicating and recording device may automatically move to inoperative position upon variation of the thickness of the material in excess of its recording capacity.

A still further object is to obviate drag on the sheeted material or wrinkling thereof by the contacting device of the recording and indicating mechanism.

For a detailed disclosure of the invention reference is had to the accompanying specification and drawing, in which latter:

Fig. 1 is a front elevation of the gauge and its supporting mechanism;

Fig. 2 is a side elevation thereof;

Fig. 3 is a transverse section through the gauge; and

Fig. 4 is a longitudinal section therethrough.

Referring to the drawings the numeral 1 indicates a support having a transverse channel therein at 2 for the reception of a slide block 3, which latter is adjusted in the channel by means of a screw rod 4 threaded into the block and having at one end an operating handle 5. A plate 6 is pivotally connected at 7 to the slide block and on its forward face is provided with the channels 6' in which is movable a bracket 8. The bracket 8 and plate 6 are provided with aligned bosses 9 and 10, and a screw rod 11 is threadedly connected to the boss 9 and rotatably mounted in the boss 10, while on its upper end it is provided with a gear 12 meshing with a gear 13 on shaft 14, the latter being mounted in bearings 15 on a bracket 16 secured to the plate 6. At the end opposite to the gear 13 the shaft 14 is provided with a hand wheel 17.

The gauge mechanism proper is provided with an outer casing 18 which is secured to the bracket 8 in offset relation as shown in Fig. 2, and adapted to engage with the curved rear wall of the casing 18 is a cam 19 mounted on a shaft 20 having the operating handle 21, the purpose of which cam will be later explained. Extending downwardly from the casing 18 is a bracket 22, at the lower end of which is a pivotal thrust bearing 22' for a yoke 23, in the free ends of which is secured the spindle 24 of a contact roller 25. In order to reduce friction as much as possible this roller may be provided with antifriction bearings. At its medial portion the roller 25 is provided with a circumferential recess 26 for a purpose to be later explained. A supporting roll 27 carried on anti-friction bearings is provided for the stock 28 at the point where the contact roller 25 engages the stock. The support 1 is extended downwardly and forwardly at the sides as shown in Fig. 2 to provide a mounting for the roll 27. Owing to the minute measurements involved it was found essential to thus couple up the gauge and supporting roll on a unitary mounting. Also mounted on the spindle 24 is a yoke 29, which is provided with a boss or shouldered portion 29' from which extends a thrust member 30 adapted to move in an opening in a threaded cap 30' secured to the lower end of the casing 18. The thrust member 30 carries at its end an enlargement or head 31 which is movable in an enlarged bore 32 in that portion of the casing within the cap 30'. The upper end of the head 31 is rounded as shown in Figs. 3 and 4, and is adapted to engage a head 33 provided at the end of the lower portion 34 of a rack rod, the portion 34 being threadedly secured to the upper portion 35 of the rack rod for convenience in assembling. Disposed within the bore 32 around the part 34 of the rack rod is a light coil spring 36 one end of which is adapted to contact with the end wall of bore 32, while the other end presses against the head 33. The upper portion 35 of the rack rod is provided with a rack 37 which meshes with a pinion 38 mounted on shaft 39, the latter also having secured to it a gear 40 meshing with a pinion 41 on a shaft 42. The shaft 42 has secured thereon a gear 43 meshing with a pinion 44 on the shaft 45 of the indicator needle 46, and cooperating with the needle 46 is a dial 47. At the point where the shaft 45 passes through the rack rod the latter is slotted as shown at 48 in order to allow movement of the rack rod.

Secured on the shaft 45 is an involute cam 49 having a cam slot 50 of corresponding shape. Pivotally secured to an inner partition wall at 51 is a marker arm 52 having a curved portion as shown in Fig. 3. Secured to the curved portion of the arm at 53 is a short arm 54 carrying at its free end a cam follower 55 disposed in the cam slot 50. The marker arm may be provided with a pencil or with any suitable form of capillary pen.

Coacting with the marker is a movable chart support driven in any suitable manner. In the present instance there is provided an electric motor 56 which through the reduction gearing 57, 58, 59, 60, 61, 62, 63 and 64 is adapted to drive the hub 65, the latter being rotatable on anti-friction bearings on the shaft 66 pinned in the casing 18. Removably secured on the hub 65 is a drum or chart support 67 to which the ruled chart 68 may be secured in any desired manner. As one of the important features of the gauge is that it show calender production, it is essential that the chart support act as a moving time clock dial keeping accurate time. We have found by experiment that the chart support must have as great a surface speed as is practical in order that the variations in the stock gauge as recorded by the pen shall not run together. We have therefore made the chart support as large as is practical and have made it make one revolution in five hours. The curved ordinates of the chart (Fig. 1) show the gauge in thousandths of an inch and the abscissæ the accurate time.

In operation the handle 5 is manipulated to dispose the gauge mechanism at the desired position transversely of the stock, and the hand wheel 17 is operated to adjust the gauge in the proper position vertically. The stock 28 passes between the contact roller 25 and the roll 27 in the direction indicated by the arrow in Fig. 2, and upon an increase of the thickness of the material passing under the roller 25 the latter is lifted, with consequent raising of the yoke 29 and thrust member 30, which latter, through its head 31 in contact with the head 33 of the rack rod operates the rack, which latter through its multiplying gear connections rotates the indicator needle in a clockwise direction. During this movement of the indicator needle its shaft 45 also rotates the involute cam 49, which latter through the cam follower 55 actuates the marker arm 52 in a clockwise direction. As a consequence of the movement of the rack rod the spring 36 is compressed, and upon a decrease in the thickness of the material passing under the roll 25 the spring 36 expands and reverses the movements of the parts just described, causing the gauge needle and marker arm to move in an anti-clockwise direction. As the rack rod and the thrust member 30 are entirely separate and the rack rod is actuated in a direct line only by the contact of the rounded head 31 of the thrust member 30 with the head 33 of the rod it will be seen that no side pressure is brought upon the rack rod and any tendency of the latter to bind is completely obviated, with a resultant reduction in the internal friction of the gauge. By the use of the involute cam for transmitting movement to the marker arm the internal friction is also greatly reduced while securing a simplified driving connection with the marker arm. A valuable feature of this construction is that, as the indicator needle, its shaft and the cam 49 are rigidly connected, and the arm 54 driven by the cam is also rigidly connected to the pivoted marker arm, there is a direct drive from the needle to the marker arm, reducing lost motion between the gauge and recorder to a minimum and thereby insuring absolute accordance in the indications of the gauge and recorder. The drag of the soft and tacky stock on the contact roller would cause considerable side thrust and binding on the thrust member 30 if this member were the sole support of the contact roller. However, by the provision of the yoke 23 pivoted at 22′ in substantially the horizontal plane of the roller axis the thrust caused by the stock is completely taken up by the thrust bearing 22′. It will be noted that the contact roller 25 has a relatively long bearing contact on the stock, which, with the light pressure of the roller, obviates any tendency of the roller to sink into the soft and plastic stock with resultant incorrect gauging of the material. Experiment has shown that thoroughly dried wood forms the most suitable material for use in the roller, but other materials may, of course, be used. It has been found that the drag of the stock on the rollers previously used has a tendency to cause the stock to pile up or wrinkle in front of the roller, but by reason of the recessed portion 26 this tendency is obviated. The shoulder 29′ and head 31 in connection with the cap 30′ form a stop for limiting the movement of the contact roller in either direction, and correspondingly limit the movement of the gauge needle and marker arm. The distance between the shoulder 29′ and cap 30′ will, of course, be made in accordance with the capacity of the gauge and marker used. Should an obstruction or piece of material of a thickness greater than the indicating capacity of the gauge pass under the contact roller 25 the latter will first move upwardly until the shoulder 29′ contacts with the cap 30′ and the entire gauge mechanism will then swing outwardly and upwardly on the pivots 7, thereby obviating any injury to the gauge. If for any reason it be desired to temporarily withdraw the gauge from operating position without varying its adjustment such as when passing the end of a new piece of stock beneath the contact roller, all that is necessary is for the operator to swing up the cam 19 by its handle 21 to a position at right angles to that shown in Fig. 2, when the cam face will come into engagement with the casing 18, thereby swinging the gauge mechanism outwardly upon its pivots 7 in the same manner as when an obstruction passes beneath the contact member 25.

It will be seen that by our invention a gauge has been provided in which the internal friction has been greatly reduced, which will quickly respond to variations in the thickness of the stock being gauged, and which is capable of accurately indicating and recording very slight variations in thickness in sheeted material of a plastic and tacky nature. Also by means of a suitable chart and drum speed the production of the calender can be determined. Moreover all tendency of the contact roller to sink into or stick to the stock has been eliminated. While the gauge has been particularly designed and adapted for use with a plastic sheeted material, it is obvious that it is at the same time capable of general use for gauging any sheet material.

Having thus described our invention, what we claim and desire to protect by Letters Patent is:

1. An indicating device for sheet stock comprising a movable sheet contacting member, a cam, driving connections between said member and cam, a chart support, a marker, and means for actuating said marker from said cam.

2. An indicating device for sheet stock comprising a movable sheet contacting member, an involute cam, driving connections between said member and cam, a follower for said cam, a chart support, a pivotally mounted marker, and a connection between said marker and follower.

3. A recording gauge mechanism for sheet stock comprising a dial, an indicating needle having a shaft, sheet contacting mechanism adapted to actuate said shaft, a recording device including a marker, and a direct driving connection between said shaft and marker.

4. A recording gauge mechanism for sheet stock comprising a dial, an indicating needle therefor having a shaft, sheet contacting mechanism adapted to actuate said shaft, a slotted involute cam secured to said shaft, a recording device including a marker, and a follower for said cam slot carried by the marker.

5. A recording gauge mechanism for sheet stock comprising a recording device, a gauge, a contact member actuable by variations in the thickness of the stock, multiplying connections between said member and the gauge, and multiplying connections including an involute cam between said first connections and the recording device.

6. A recording gauge mechanism for sheet stock comprising a recording device, a gauge, a contact member actuable by variations in the thickness of the stock, and multiplying connections between said member and the gauge and recording device, said connections including an involute cam.

7. A recording gauge mechanism for sheet stock comprising, a chart, a marker therefor, a dial, an indicating needle therefor, a movably mounted member adapted to contact with the stock, multiplying driving connections for transferring the movements of said member to said needle, and multiplying connections between said first connections and said marker including a cam.

8. A recording gauge mechanism for sheet stock comprising a dial, an indicating needle therefor, a rack, multiplying driving connections between said rack and needle, a thrust member for actuating said rack, a sheet contacting device carried by said thrust member, an involute cam driven from said multiplying connections, a chart supporting means, and a chart marker operatively connected to said cam.

9. A recording gauge mechanism for sheet stock comprising a dial, a shaft having an indicating needle thereon, a sheet contacting device, multiplying driving connections between said device and shaft, an involute cam mounted on said shaft, a chart supporting means, a chart marker, and a follower for said cam operatively connected to said marker.

10. A recording gauge mechanism including in combination a chart, means for moving the chart, a marker, a dial gauge, a contacting roller, a guiding device for said contacting roller hinged to a relatively fixed abutment at a point in advance of the roller, and means for simultaneously actuating the marker and dial gauge from the contacting roller.

11. A gauge for sheeted plastic material comprising indicating mechanism, a reciprocable member for actuating the same, a thrust member independent of but adapted to actuate said reciprocable member by contact therewith, and a sheet contacting roller carried by said thrust member.

12. A gauge for sheeted plastic material comprising indicating mechanism, a thrust member adapted to actuate the same, and a sheet contacting roller carried by said thrust member, said roller having a portion of its surface recessed, whereby wrinkling of the sheeted material is prevented.

13. A gauge for sheeted plastic material comprising indicating mechanism, a thrust member adapted to actuate the same, and a sheet contacting roller carried by said thrust member, said roller having its surface recessed at its medial portion.

14. In a recording gauge mechanism for sheet stock, a recording device and gauge, offset means for pivotally supporting the same, a sheet contacting roller having a pivotal mounting substantially in the horizontal plane of its axis, actuating means for the recording device and gauge including a rack, and means independent of said rack for imparting a direct thrust movement thereto from said roller.

15. A gauge for sheeted plastic material comprising indicating mechanism, a thrust member adapted to actuate the same, a wooden sheet contacting roller carried by said thrust member, said roller having its surface recessed at its medial portion, and a pivotal thrust bearing for said roller disposed substantially at right angles to said thrust member.

16. A gauge for sheeted material comprising indicating mechanism, a thrust member adapted to actuate the same, a sheet contacting means carried by said thrust member, and a pivotal thrust bearing for said means.

17. In a gauge for sheet stock, indicating means, means for pivotally supporting the same, means for moving the indicating means transversely and vertically with respect to the sheet, said indicating means including a thrust member for actuating it, and a sheet contacting device carried by the thrust member.

18. In a gauge for sheet stock, a gauge mechanism including a movable contact device, a stop for limiting the movement of said device, a support, and means whereby the gauge mechanism may swing on its support upon passage under the contact device of material greater in thickness than the limit of its stop.

19. In a gauge for sheet stock, a gauge mechanism including a movable contact device, a stop for limiting the movement of said device, a support, means whereby the gauge mechanism may swing on its support upon passage under the contact piece of material greater in thickness than the limit of its stop, and means for at will swinging the gauge mechanism on its support.

20. A recording gauge mechanism for sheet stock comprising a recording device and gauge, a pivotal support therefor, means for adjusting the support laterally, means for adjusting the recording device and gauge vertically, a pivotally mounted sheet contacting device, and multiplying connections between said contacting device and the recording device and gauge.

21. A recording gauge mechanism for sheet stock including in combination, a chart, means for moving the chart, a marker, a dial gauge, a contacting member having a relatively extended line contact with the stock, means for taking up side thrust on said member by the stock, means for simultaneously actuating the marker and dial gauge from the contacting member, a frame operatively supporting the aforementioned elements, and means for adjusting the frame in a direction generally parallel to the direction of movement of the contacting member, whereby to adapt the mechanism to different thicknesses of stock or to move it to inoperative position.

22. A device for indicating the variations in thickness of sheet material having in combination, a graphic recorder including a chart and a movable marker, a gauge having a dial and movable hand, a sheet contacting member, means for taking up side thrust thereon by the sheet, separate contacting thrust members actuated by said member, and means for moving the marker and hand from the thrust members including a shaft to which the hand is affixed, and means on the shaft for actuating the marker.

Signed at Malden, county of Middlesex, State of Massachusetts, this 3d day of November, 1921.

GEORGE L. LAWRENCE, Jr.

Signed at Melrose, county of Middlesex, State of Massachusetts, this 2nd day of November, 1921.

LEON A. FIELD.